Oct. 3, 1961  J. R. PADRICK  3,002,574
SYSTEM AND IMPLEMENT FOR DEEP TILLAGE OF THE SOIL
Filed Jan. 26, 1956  2 Sheets-Sheet 2
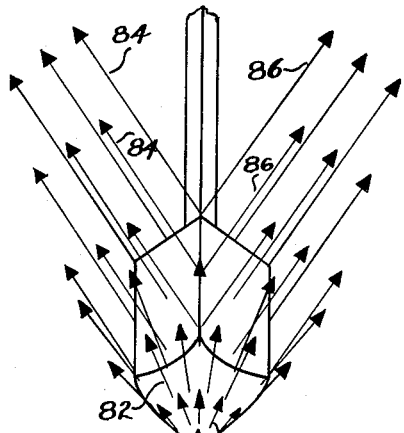
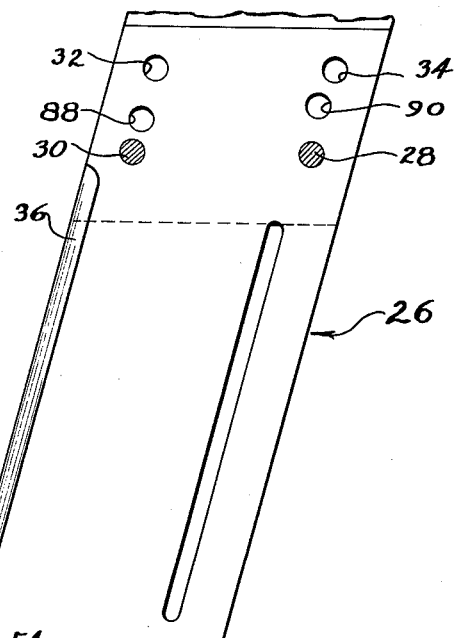
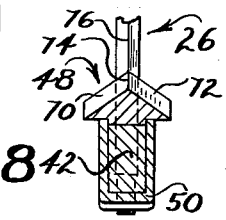
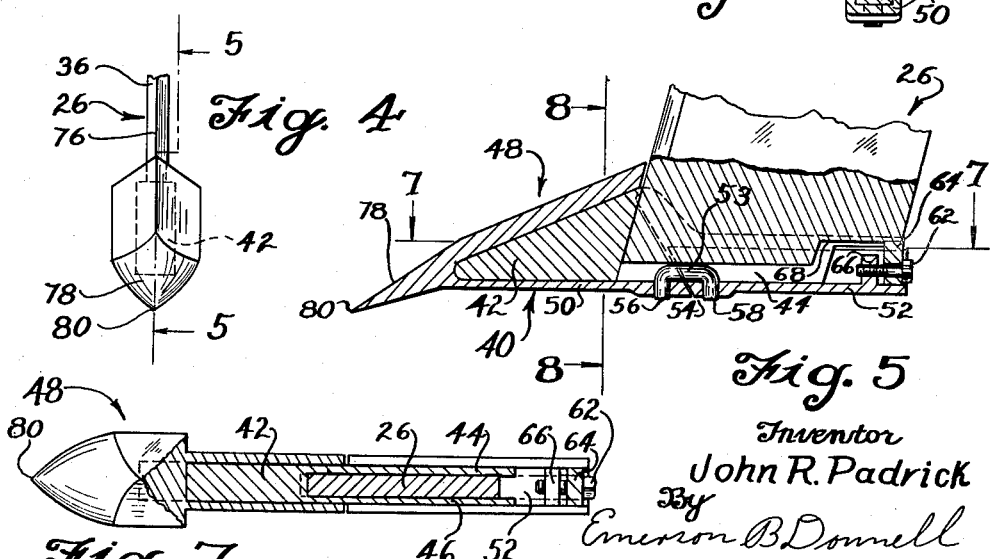
Inventor
John R. Padrick
By Emerson B. Donnell
Attorney United States Patent Office 3,002,574
Patented Oct. 3, 1961

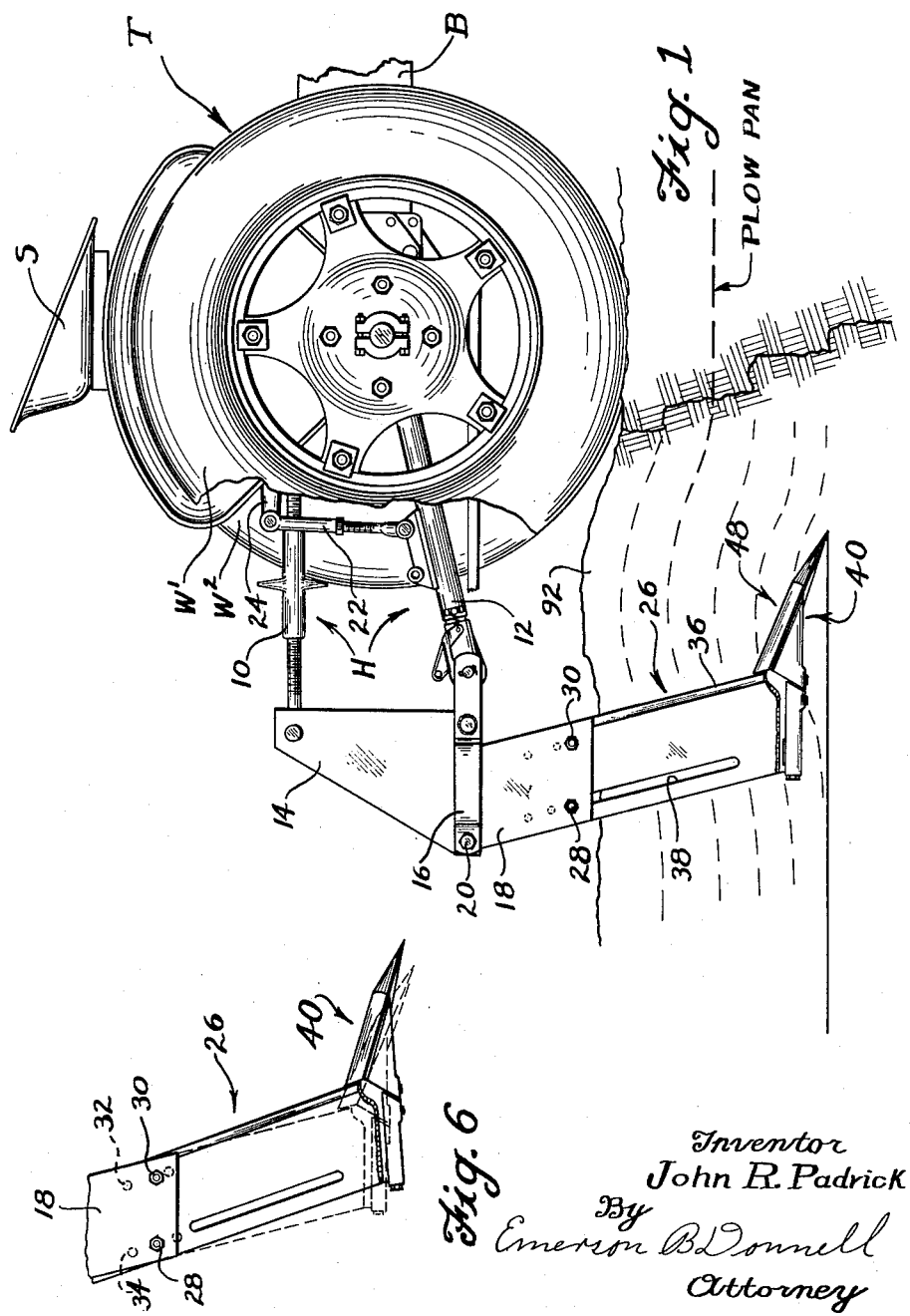

3,002,574
SYSTEM AND IMPLEMENT FOR DEEP TILLAGE
OF THE SOIL
John R. Padrick, Anniston, Ala.
(P.O. Box 1240, Columbus, Ga.)
Filed Jan. 26, 1956, Ser. No. 561,702
5 Claims. (Cl. 172—699)

The present invention relates to a system and implement for deep tillage of the soil and an object of the invention is to generally improve the practice of such process and the character of implements intended for this purpose.

More specifically, an object of the invention is to provide a deep tillage implement or subsoiling implement which will cause a minimum disturbance of the soil, which will bring little or no subsoil material to the surface, which will set up a wide fracture pattern in the subsoil, as compared with known types of subsoiling implements so as to provide extensive and even distribution of plant nutrients, soil correctives, fumigants, etc. and at the same time will be reasonable in its power requirements.

Another object is to provide such an implement which will be adjustable so as to work efficiently whether the soil is moist or relatively dry, and a further object is to provide such a device in which the working point, subject to the greatest wear, is readily removable and replaceable.

Further objects and advantages will become apparent from the following specification and drawings in which the system and an illustrative example of a subsoiling implement embodying the invention are described and shown.

In the drawings, FIG. 1 is a fragmentary right side elevation with parts in axial section of a tractor carrying in draft relation a subsoiling implement embodying the invention.

FIG. 2 is an enlarged left side elevation of a portion of the structure shown in FIG. 1, including a diagrammatic representation of certain force lines.

FIG. 3 is an enlarged front elevation of a portion of FIG. 2 indicating the force lines from a different viewpoint.

FIG. 4 is a front elevation of a portion of the structure shown in FIG. 2.

FIG. 5 is a sectional view of the structure shown in FIG. 2 on the line 5—5 of FIG. 4.

FIG. 6 is a right side elevation of certain mechanisms indicated in FIG. 1, showing parts in a different adjustment.

FIG. 7 is a horizontal sectional view on the line 7—7 of FIG. 5.

FIG. 8 is a vertical sectional view on the line 8—8 on FIG. 5.

Similar reference characters have been applied to the same parts throughout the specification and drawings.

Referring to FIG. 1, the device is shown attached to a tractor, generally designated as T, having traction wheels W1 and W2, a driver's seat S, and a main body portion B, the other usual parts of a tractor being understood as being present, but omitted from the drawing since they form no part of the present invention. The implement is carried on tractor T in any suitable manner, in the present instance on a multiple link hitch of a well-known type, generally designated as H, comprising upper and lower links 10 and 12 pivotally attached to a mast 14 and frame portion 16 respectively, the assemblage including a forwardly and downwardly inclined plate 18, the whole being secured together in a very substantial manner such as welding, bolts, or the like shown as 20. The structure to this point provides a means for very ruggedly supporting the frame and draft connecting it to tractor T, and the height of frame 16 may be readily changed by upward swinging of links 10 and 12 in well-known manner about certain pivot points on the tractor, not shown, such swinging being effected by a link 22 pivoted between a power lift arm 24 and above-mentioned link 12, frame 16 together with plate 18 serving to propel the subsoiling implement and to exert thereon the very substantial force which is necessary to drive it through the ground at the desired depth, for example 14 inches, and the parts are so proportioned that this amount of force can be exerted well within the safe loading limit of these parts.

The implement itself comprises a downwardly and forwardly inclined plate-like stock, generally designated as 26, which is rigidly and strongly united with above-mentioned plate 18 as by bolts 28 and 30, extending through plate 18 and engaged in suitable holes as 32 and 34 in stock 26. Stock 26, as more particularly shown in FIG. 4, is relatively thin and has a sharp or knife-like front edge 36 so as to cut through the ground and push it aside with a minimum of resistance to forward movement. Furthermore, the forwardly inclined position of stock 26 results in an upward component of the force exerted by blade 36 against the ground, the ground being relatively free to yield upwardly so that there is no direct lateral compression of the soil such as would introduce severe resistance to travel of stock 26. Furthermore, the ground through which stock 26 travels will have been loosened appreciably just before being encountered by said stock as will appear, and which facilitates the passage of the stock through the soil.

Stock 26 is of greater dimensions axially, or more properly in the direction of travel, than stocks heretofore known, and is provided with a slot toward the rear or trailing edge for attachment of implements not shown, designed to cooperate with cutting edge 36.

Stock 26 carries at the bottom thereof a specially formed mole or plowing element generally designated as 40 and the characteristics of which, in conjunction with stock 26, make possible the outstanding results and effectuate the objects hereinbefore enumerated.

Stock 26 as more particularly shown in FIGS. 4 and 7 has a frog portion including a nose, core, or shank 42 of a width greater than the thickness of stock 26 and having spaced rearwardly extending strips or sides 44 and 46, FIG. 2, which include between them the thickness of stock 26 and provide a channel-like space beneath the lower margin thereof. Strip portions 44 and 46 are permanently united or welded to the stock, forming a permanent part thereof, so that core portion 42 is in effect a part of stock 26.

A shoe, generally designated as 48 fits about core portion 42 and provides an outer contour to be described which is to a large extent responsible for the improved operation. Shoe 48 has a rearwardly extending lower wall or floor 50 extending backwardly beneath core portion 42 and closing the forward part of the channel beneath stock 26. An upwardly open channel-like slide 52 fits about side strips 44 and 46 and encloses the remainder of the space therebetween, the rear margins of shoe portion 48 and the forward margins of channel 52 approaching each other in a downwardly and rearwardly inclined joint or contact plane, indicated as 54. Floor portion 50 and channel portion 52 have suitable downwardly directed bores engaged by a hook-like or U-shaped tension member 53 having downwardly extending legs 56 and 58 engaged respectively with portions 50 and 52, so that rearward movement of slide 52 will cause corresponding rearward movement of shoe 48 until it is firmly seated or engaged with core portion 42, whereupon further movement will be impossible, whereas the inclined contact or joint between shoe 48 and channel 52 prevents dropping of channel 44 at any time, and particularly during assembly operations, since the latter rests upon shoe 50 at such times as there is no tension on the U-shaped connecting element 53. This makes a very effective way to clamp shoe 48 in place, the necessary backward clamping movement being imparted to channel member 52 in the present instance by means of a screw 62 extending through an ear 64 fixed on the lower rear portion of stock 26 and the side strips 44 and 46, and threaded into a boss 66 fixed within the rear part of channel 52.

Stock 26 and side strips 44 and 46 are preferably notched, as at 68, to provide ample room for movement of boss 66. In this manner, shoe 48 is firmly clamped on core 42 against any accidental displacement, but when seriously worn, may be readily removed by merely removing screw 62 and tapping the parts in a forward direction by means of a hammer or a similar instrument, a new shoe 40 is substituted in place of the worn one and screw 62 is reinserted and tightened, whereupon the effectiveness of the implement is restored. We now come to a description of the contours of the shoe 48.

As hereinbefore indicated, it is desirable in subsoiling operations to cause a minimum disturbance or displacement of the soil, the object being to cause a cracking or fracture pattern in the soil well beneath the usual "plow pan" or hard surface which tends to form at the lower boundary of the usual plowing operation. In other words, we wish to crack up this hard subsoil over a substantial area but without moving it very much out of its original position. It should not be brought up into the topsoil, but merely cracked and loosened up a little. Furthermore, any direct compression of the soil, such as in a horizontal or even a downward direction, in the first place would not accomplish anything useful and in the second place would require a large amount of power as compared with the process to be described.

In the present device, the contours and action of the parts produce pressure on the soil which extends in the direction of diminishing mass, upwardly, laterally, and forwardly. The soil is, of course, free to yield in such a direction without being materially compressed in the process since, as it fractures, the fragments may rise with an accompanying lifting of the topsoil and the ground surface, the necessary pressure in such a direction being only that necessary to fracture the soil in the first instance and to overcome the weight of the soil extending up to the surface. In other words, the soil has a place to go when acted upon by the implement and is not directly compressed by the action. This desirable result is brought about by the contour or shape of the subsoiler point.

As seen particularly in FIGS. 1 through 5 and 7, the shoe 48 has an upper portion characterized by two intersecting downwardly and forwardly inclined surfaces 70 and 72, intersecting at a ridge 74 so that the aspect is not unlike the top of an inclined gable. Ridge 74, when the parts are assembled, becomes continuous with the knife edge 36 so that a substantially knife-like edge or at least a sharp edge is presented throughout the extent of the upper portion of shoe 48 and the front edge of stock 26. Shoe 48 also has a lower portion which is distinguishable from the upper portion comprising surfaces 70 and 72 by being inclined downwardly at a steeper angle and presenting an upper curved surface 78 of forwardly diminishing width, terminating at an actual point 80. The initial impact area or region in which the implement first encounters the soil is therefore very small—theoretically zero—so that any direct compression of the soil is kept at a minimum. The force lines or direction of action of the lower portion against the soil extend virtually normal to the surface 78, forwardly and upwardly through the soil, in the direction in which it can yield readily by fracturing and rising slightly, these lines being indicated at 82 and radiating upwardly from the curved surface as best shown in FIG. 3. On the other hand, the forces exerted by the intersecting surfaces 70 and 72 of the upper portion extend upwardly and outwardly, virtually normal to the surfaces, in the direction in which the soil can yield without direct compression, these force lines, however, being substantially parallel to each other for either of said surfaces, as 84 and 86. While it is not intended to limit the invention to any specific angle of the surfaces 70 and 72, it has been found that the purposes of the invention are well served by the disposition of these surfaces at angles in the region of 35° from the horizontal when the device is in use.

As a result of the particular shape of the point as just described, the initial impact area of the point is kept small and any direct compressive action on the soil is avoided, the compressive action which is generated being in the direction in which the soil can yield. Furthermore, all flat areas normal to the direction of travel are avoided so that fragments broken from the subsoil are displaced merely enough for an implement to pass through and are not lifted out of position and are never brought upwardly materially into the topsoil or even completely through it to the surface, as occurs in many heretofore known constructions. The upwardly and outwardly directed pattern of the forces represented by the lines 82, 84, and 86 tends to spread these forces through a relatively large area on either side of the point so that the fracture pattern is not dependent on any cohesion of the soil material, the material being acted upon directly by forces extending substantially normal to the shoe surfaces, and spreading upwardly throughout a substantial area about and above the point. It is also to be noted that the initial impact area of the stock is continuous with the initial impact area 80—74 of the shoe, and comprises that part of the knife edge 76 in the region of numeral 87.

Incidentally, it may be noted that such widespread fracture pattern provides for direct absorption of moisture into the subsoil below the usual plow pan and storage of it for later capillary return. Furthermore, by virtue of the substantial width of the stock 26, it may be made comparatively thin and presents a very narrow aspect to the soil, as a result, the slit made in the soil being narrow and soon closing to avoid excessive drying.

The above described fracturing action in the soil will vary somewhat in accordance with the amount of moisture in the soil, the best results being accomplished with one angle or forward slope when the soil is dry and with a different slope when the soil is wet. This is illustrated in FIG. 6, the normal dry position being shown in full lines and the increased angle for the wet position being shown in dotted lines.

Referring to FIG. 2, the holes 32 and 34 are irregularly spaced in the stock 26 in order to register with the holes in plate 18 in a different position of stock 26. Thus, holes 88 and 90, when matched with holes in plate 18 will cause the implement to take the position shown in full lines in FIG. 6 as well as to run at a somewhat greater depth than the FIG. 1 position. If the latter is undesirable, it is readily corrected by raising links 10 and 12 an appropriate amount through operation of the usual power lift 24.

It is to be noted that the implement pulls easier in the full line position of FIG. 6 than it does in the dotted position, and this fact may be utilized also when the available power is limited, although it is to be noted that the fracture pattern in the soil is not the same as it is with the implement in the other position.

The operation of the device is thought to be clear from the above description but by reference to FIG. 1, it is apparent that particles of the soil in advance of point 48 are raised a certain amount by the passage of the same and flow along the side of the point to return to approximately the original positions. The result produces a well-defined bulging or raising of the soil at 92 and a falling back thereof, beginning even before stock 26 reaches the bulging portion, the soil, of course, never returning entirely to its original position, but remaining loosened as a result of the subsoiling operation.

The above being a complete description of an illustrative embodiment of the invention suitable for practicing the process, what is claimed as new and desired to be secured by Letters Patent of the United States is:

1. A subsoiler shoe characterized by upper and lower distinct portions, the upper portion having two upwardly, backwardly, outwardly inclined and intersecting upper substantially plane surfaces and the other portion being of upwardly curved configuration intersecting the first mentioned portion, the last mentioned portion having upward and backward inclination which is steeper than that of the first mentioned portion, and said last mentioned portion tapering to a point at its forward extremity.

2. A subsoiler shoe characterized by upper and lower distinct portions, the upper portion having two upwardly, backwardly, outwardly inclined and intersecting substantially plane upper surfaces and the other portion being of upwardly arcuate configuration intersecting the first mentioned portion, the last mentioned portion having forward and downward inclination which is steeper than that of the first mentioned portion, and said last mentioned portion tapering to a point at its forward extremity.

3. A subsoiler shoe characterized by upper and lower distinct portions, the upper portion having two upwardly, backwardly, outwardly inclined and intersecting upper surfaces and the other portion being of upwardly convex configuration intersecting the first mentioned portion, the last mentioned portion having forward and downward inclination which is steeper than that of the first mentioned portion, and said last mentioned portion tapering to a point at its forward extremity.

4. A subsoiler construction including a shoe element characterized by upper and lower distinct portions and an upwardly extending plate-like stock extending from the upper portion, the upper portion of said shoe element having two upwardly, backwardly, outwardly inclined and intersecting substantially plane surfaces forming an upwardly and rearwardly inclined ridge and the other portion having an upwardly curved configuration intersecting the first mentioned portion, the last mentioned portion having upward and backward inclination which is steeper than that of the first mentioned portion, said last mentioned portion tapering to a point at its forward extremity and said upwardly extending stock providing a sharp upwardly and rearwardly inclined cutting edge continuous with said ridge on said upper portion of said shoe.

5. A subsoiler construction including a shoe element characterized by upper and lower distinct portions and an upwardly extending plate-like stock extending from the upper portion, the upper portion of said shoe element having two upwardly, backwardly, outwardly inclined and intersecting substantially plane surfaces forming an upwardly and rearwardly inclined ridge and the other portion having an upwardly curved configuration intersecting the first mentioned portion, the last mentioned portion having upward and backward inclination which is steeper than that of the first mentioned portion, said last mentioned portion tapering to a point at its forward extremity, said upwardly extending stock providing a sharp cutting edge continuous with said ridge on said upper portion of said shoe, and rearwardly and upwardly inclined at a steeper angle than either said first mentioned or said last mentioned portions.

References Cited in the file of this patent

UNITED STATES PATENTS

| | | |
|---|---|---|
| Re. 3,616 | Murfee | Aug. 24, 1869 |
| 1,302,543 | Hart | May 6, 1919 |
| 1,885,231 | Chong | Nov. 1, 1932 |
| 2,129,453 | Van Sickle | Sept. 6, 1938 |
| 2,669,067 | Severance | Feb. 16, 1954 |
| 2,684,617 | Johnston | July 27, 1954 |
| 2,757,595 | Clifford | Aug. 7, 1956 |